(12) United States Patent
Belsaas

(10) Patent No.: US 6,625,889 B2
(45) Date of Patent: Sep. 30, 2003

(54) DEBURRING TOOL

(76) Inventor: Kenneth L. Belsaas, 2111 S. 60th St., Lincoln, NE (US) 68506

( * ) Notice: Subject to any disclaimer, the term of this patent is extended or adjusted under 35 U.S.C. 154(b) by 14 days.

(21) Appl. No.: 09/928,202

(22) Filed: Aug. 10, 2001

(65) Prior Publication Data

US 2003/0029046 A1 Feb. 13, 2003

(51) Int. Cl.$^7$ ................................. B26B 27/00
(52) U.S. Cl. .................. 30/280; 30/125; 30/294; 30/456
(58) Field of Search ............ 30/280, 294, 484, 30/281, 125, 456, 462; 76/83, 88; D8/90, 91

(56) References Cited

U.S. PATENT DOCUMENTS

| 174,777 | A | * | 3/1876 | Buzby | 30/456 |
|---|---|---|---|---|---|
| 314,338 | A | | 3/1885 | Mander | 30/484 |
| 317,092 | A | | 5/1885 | Clifford | 30/484 |
| 338,570 | A | | 3/1886 | Traut | 30/484 |
| 1,021,631 | A | | 3/1912 | Savage | 30/484 |
| 1,041,049 | A | | 10/1912 | Elliot | 30/280 |
| 1,089,946 | A | * | 3/1914 | Niedomanski | 30/456 |
| 2,114,364 | A | | 4/1938 | Kilbride et al. | 30/263 |
| 2,863,478 | A | * | 12/1958 | Drybread, Sr. | 30/280 |
| 3,118,228 | A | * | 1/1964 | Adams | 30/294 |
| 3,644,993 | A | | 2/1972 | Chupp | 30/280 |
| 3,766,649 | A | * | 10/1973 | Winbauer | 30/294 |
| 3,791,014 | A | * | 2/1974 | Perna | 30/294 |
| 3,820,240 | A | * | 6/1974 | Witsell | 30/294 |
| 4,617,765 | A | * | 10/1986 | Weiler | 451/558 |
| 5,251,377 | A | | 10/1993 | Ho | 30/123.5 |
| D375,441 | S | | 11/1996 | McCoy et al. | D8/91 |
| D394,196 | S | | 5/1998 | Richardson | D8/91 |
| 5,873,167 | A | * | 2/1999 | Mason | 30/125 |
| 5,911,481 | A | * | 6/1999 | Yost | 30/125 |

* cited by examiner

Primary Examiner—Hwei-Siu Payer
(74) Attorney, Agent, or Firm—Thomte, Mazour & Niebergall; Shane M. Niebergall

(57) ABSTRACT

An improved hand tool for trimming and deburring the edges of objects made of various materials is provided with an elongated body member having a longitudinal channel formed therein for receiving the edge of the object to be trimmed. An elongated opening passes through the body member, from its lower surface into open communication with the longitudinal channel. An elongated blade is secured within the body member and positioned to selectively adjustably pass through the opening into the longitudinal channel to engage the edge being passed through the longitudinal channel. An adjustment assembly allows for incremental and consistent adjustment of the blade's cutting depth. Storage compartments are provided within the body member for conveniently and safely storing replacement blades.

18 Claims, 4 Drawing Sheets

DEBURRING TOOL

BACKGROUND OF THE INVENTION

1. Field of the Invention

This invention relates to hand tools, and more particularly to a device for trimming and deburring the edges of objects made from any number of materials.

2. Description of the Prior Art

When cutting or otherwise forming an edge in an object made from materials such as plastic, wood, and metal, a rough edge or burr may be left behind. A number of current tools are commonly found for deburring such edges, including files, open blade skill knives, sandpaper, and a plurality of hook-tipped tools. However, these devices are time-consuming to use, inconsistent in their cutting depth and angle, and even potentially dangerous to the user.

Other, more sophisticated devices, have been created to make the task of deburring quicker, more accurate, and safer. An example of one such device is that described by U.S. Pat. No. 3,644,933. The device is generally comprised of an elongated semi-cylindrical guide having a longitudinal V-shaped groove that extends the length of the guide. A transverse groove is formed in the opposite side of the guide and is adapted to receive a cutting blade that protrudes through a small opening into the longitudinal groove. When the guide member is placed over a selected edge and moved in a longitudinal direction, the cutting blade engages the edge, removing an invariable amount thereof. One obvious shortcoming of such a device is that the cutting depth cannot be selectively adjusted to customize the amount of material to be removed from the object. Moreover, the device lacks convenience in that it can only safely hold the blade that is placed in the cutting position. Replacement blades must be carried separately, where they can be easily lost or become a potential safety hazard.

Accordingly, what is needed is an improved design for a deburring tool that allows the user to quickly, efficiently, and safely trim the edges or burrs from a selected object at variable depths.

SUMMARY OF THE INVENTION

The deburring device of the present invention is comprised of an elongated generally rectangular body having a longitudinal, V-shaped channel formed in the upper surface of the body, extending between the opposite ends thereof. A generally conical opening is formed in the bottom surface of the body and extends upwardly therethrough, so that it is in open communication with the V-shaped channel in the upper surface of the body. A diagonally-disposed blade is placed in slidable contact within the body. An adjustment screw is provided at one end of the body adjacent to the rearward end of the blade. The tip of the adjustment screw is operatively engaged with the blade so that, as the adjustment screw is moved longitudinally, the blade is selectively advanced or retracted through the opening and into the V-shaped channel.

In operation, the V-shaped channel is placed against the edge of the object to be trimmed after the cutting depth of the blade has been selected. The body is then longitudinally advanced by the user so that the blade engages the edge of the object and selectively removes a portion thereof. As the edge pieces are removed, they collect within the cylindrical opening until the lower surface of the body is turned downwardly, thus allowing the edge pieces to exit the body through the lower end of the conical opening.

Longitudinally disposed compartments are placed in the end of the body opposite the adjustment screw. Each compartment is sized to hold a plurality of replacement blades within the body for future use. Plugs are placed in the open ends of the compartments to safely retain the replacement blades.

Accordingly, it is one of the important objects of the present invention to provide an improved deburring tool for quickly and safely trimming the edges of objects made from any number of materials.

Another important object of the invention is to provide an improved deburring tool that is capable of simple depth adjustment of its cutting edge, without sacrificing cutting accuracy.

An additional object of the invention is to provide an improved deburring tool capable of fully retracting its cutting edge within the body of the tool.

A further object of the invention is to provide a deburring tool capable of safely and conveniently storing a plurality of replacement blades.

It is another object of this invention to provide a tool for trimming the edges of articles of manufacture that is of economic construction and simple operation.

DESCRIPTION OF THE PREFERRED EMBODIMENT

Figure 1:
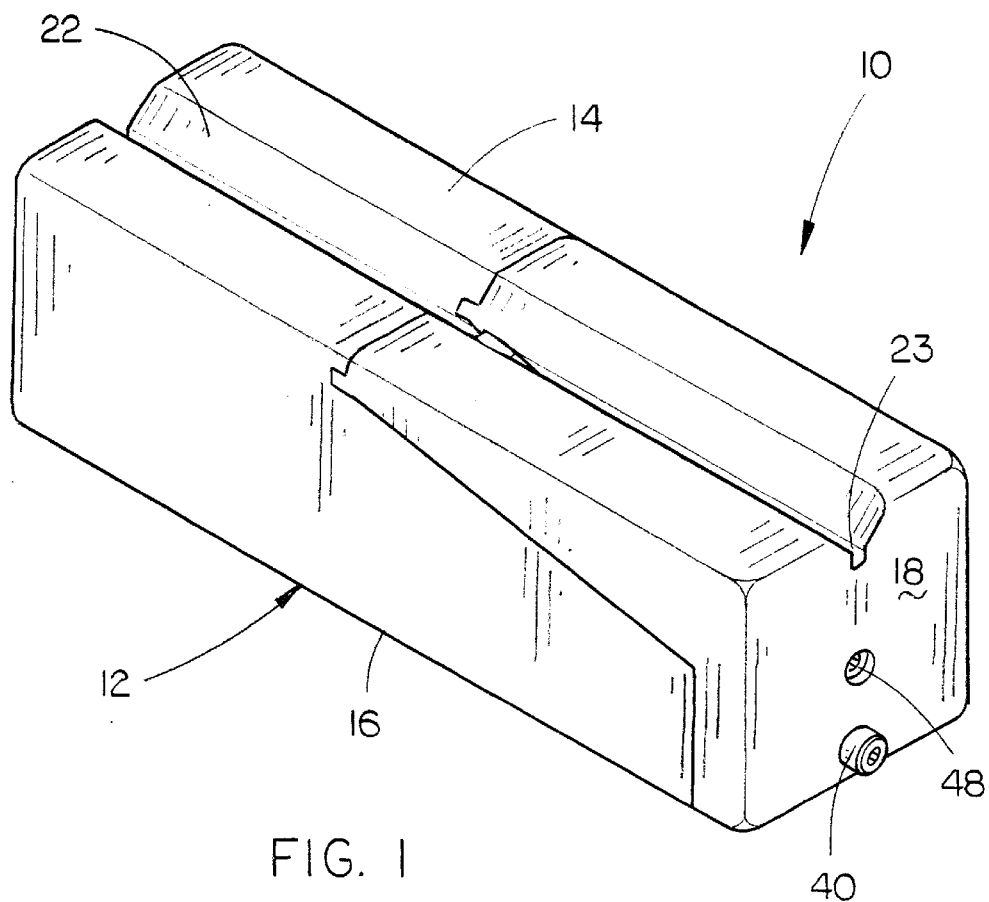
FIG. 1 is a rear perspective view of the deburring tool of the present invention.
Figure 2:
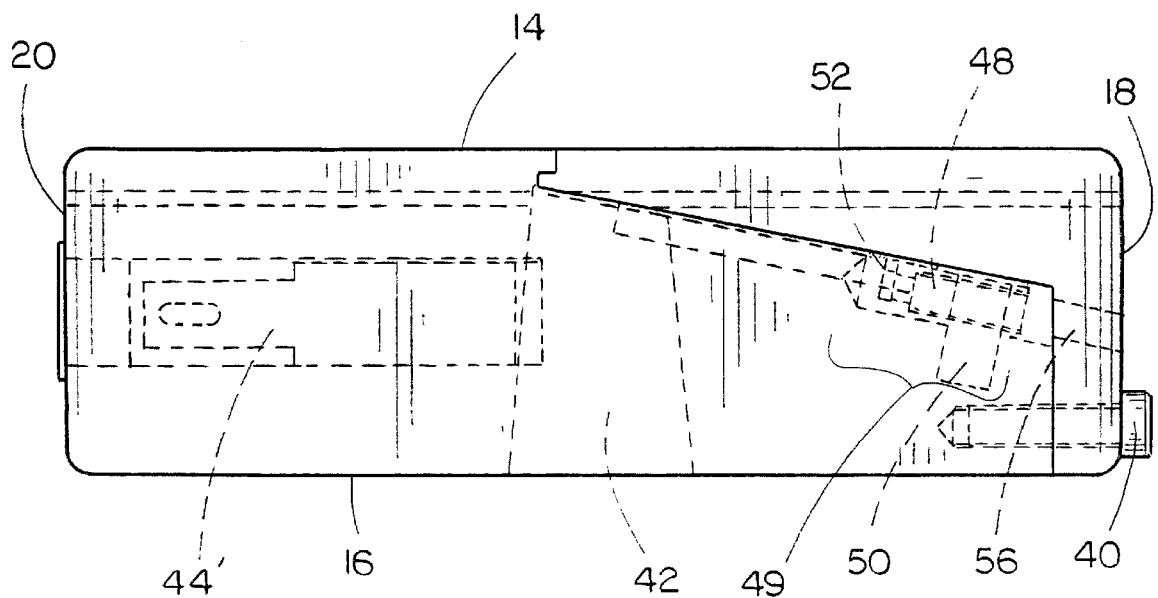
FIG. 2 is a side elevation view of the deburring tool of the present invention.

The numeral 10 refers generally to the deburring tool of this invention. As shown in FIGS. 1–6, the deburring tool 10 generally comprises an elongated body 12 having a top surface 14, a bottom surface 16, a rearward end 18, and forward end 20. A longitudinal channel 22 is formed in the top surface 14 of body 12 and preferably extends from the rearward end 18 through the forward end 20. Longitudinal channel 22 is preferably V-shaped, to accommodate the angular shape of the edge of the object to be trimmed. It is contemplated that the angle of the V-shape in longitudinal channel 22 could be formed to fit particular applications, i.e. square to angled or beveled edges.

A longitudinal channel extender 23 is formed along at least part of the length of longitudinal channel 22 to be in open communication therewith. The channel extender 23 accommodates the passage of burrs or other excess material on the object as the deburring tool 10 is passed over the object's edge. This prevents the burr or excess material from folding or crimping against the upper or side surfaces of the object, allowing the deburring tool 10 to cleanly remove the same from the object.

Figure 3:
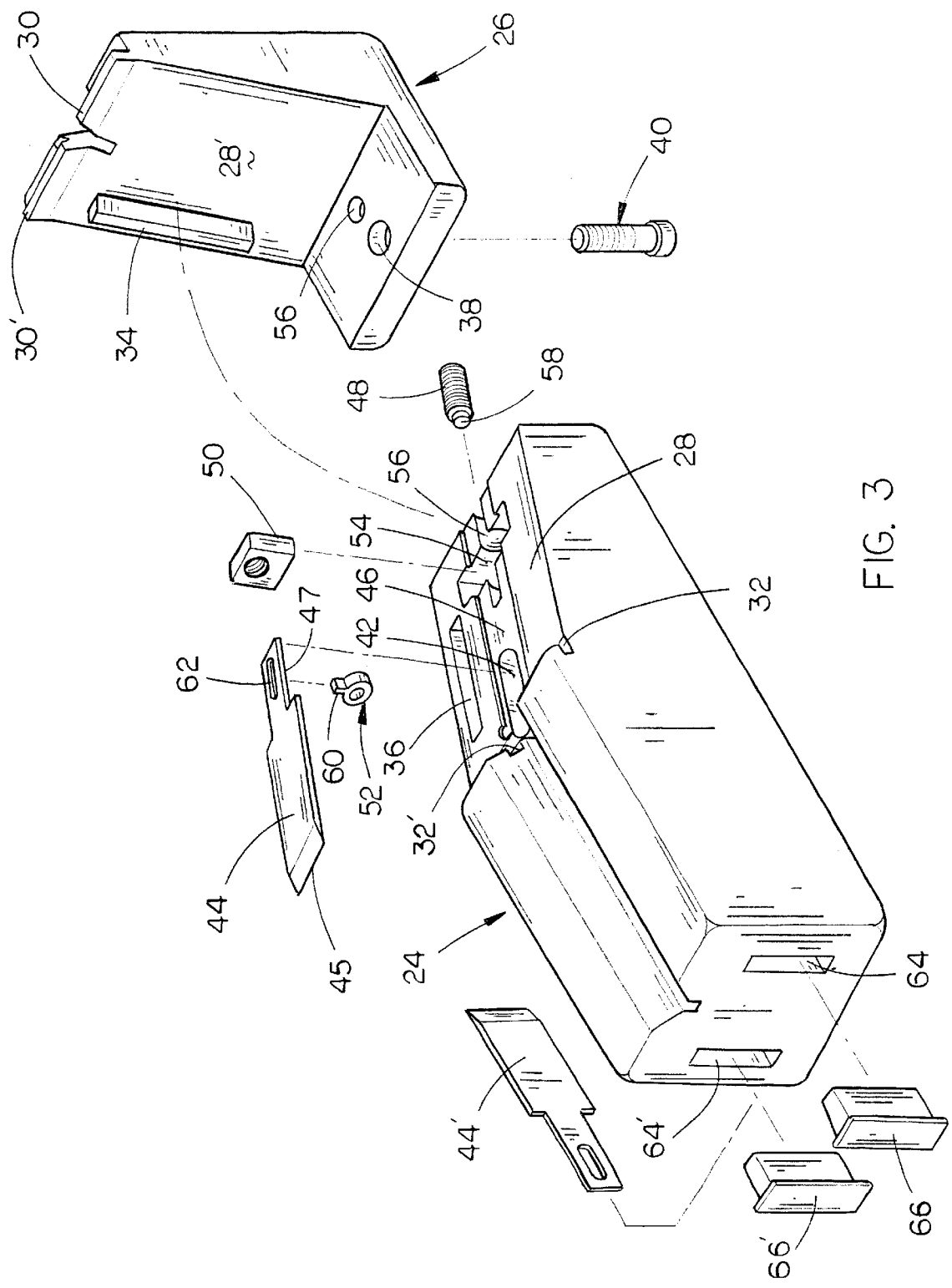
FIG. 3 is an exploded front perspective view of the deburring tool of the present invention.
Figure 4:
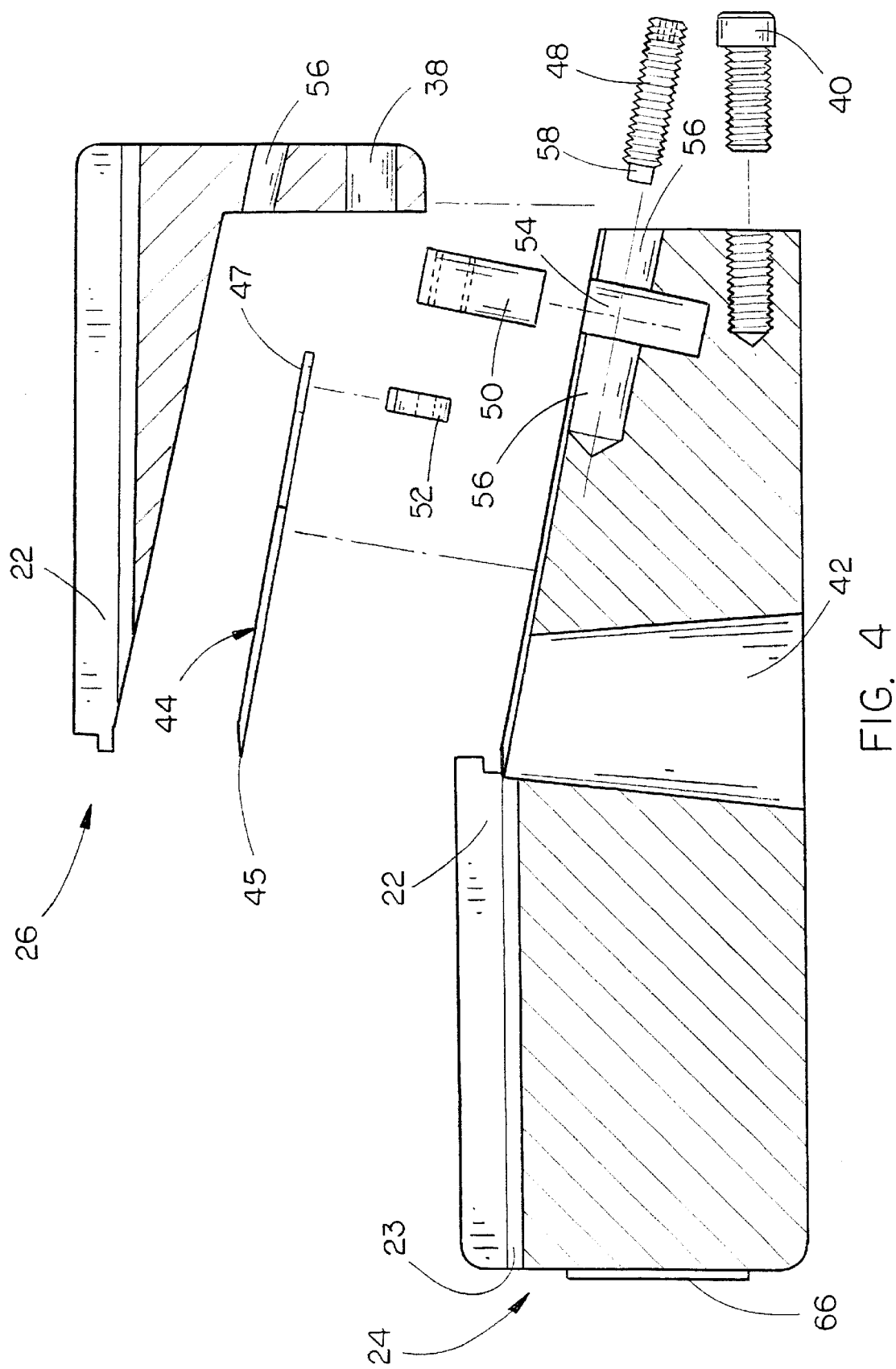
FIG. 4 is a sectional side elevation view of the deburring tool of the present invention.

In its preferred embodiment, body 12 is primarily formed from an elongated base portion 24 and angular cap portion 26. As illustrated by FIG. 3, the base portion 24 is substantially larger than cap portion 26 and is adapted to support a plurality of elements, which will be described in further detail hereinbelow. Although many different configurations are contemplated, the base portion 24 provides the forward end 20, and a substantial portion of the upper surface 14 and lower surface 16, of elongated body 12. Cap portion 26 is generally shaped to form the rearward end 18, and at least a portion of upper surface 14 and lower surface 16, of elongated body 12.

Base portion 24 and cap portion 26 are coupled together along inclined surfaces 28 and 28'. Cap portion 26 is provided with tabs 30 and 30', which are received by slots 32 and 32' formed in base portion 24 adjacent the opposite sides of longitudinal channel 22. A generally elongated key 34 extends downwardly from inclined surface 28' on cap portion 26 and is received by slot 36 formed within inclined surface 28. Cap portion 26 is further provided with a first opening 38 formed therethrough, which is accessible from the forward end of body 12. First opening 38 is adapted to receive a securing screw 40, which is longitudinally disposed through cap portion 26 and received by base portion 24 for releasably securing the cap portion 26 to base portion 24. In this secured position, tabs 30 and 30', key 34, and their respective receiving members securely lock cap portion 26 into place, preventing movement in all axis with respect to base portion 24.

An opening 42 is disposed through body 12, intermediate its forward and rearward ends, and extends from the lower surface 16 through upper surface 14. Accordingly, opening 42 is placed to be in open communication with longitudinal channel 22 for reasons discussed hereinbelow.

The generally elongated blade 44, having a cutting end 45 and opposite mounting end 47, is positioned within a blade slot 46, which is formed in inclined surface 28. Blade 44 is structurally similar to the blades commonly used in open-bladed hobby knives. Accordingly, the cutting edge can be transversely disposed across blade 44 or, alternatively at, oblique angles thereto.

An adjustment assembly 49 is provided for selectively advancing and retracting blade 44 along blade slot 46 so that the cutting edge of blade 44 can be advanced into longitudinal channel 22, through opening 42, a selected incremental distance. The adjustment assembly 49 is generally comprised of a threaded adjustment screw 48, receiving nut 50, and key 52. A generally transverse opening 54 is formed in the inclined surface 28 of base portion 24 and extends downwardly therefrom. Transverse opening 54 is preferably sized to securely receive nut 50. A generally cylindrical, longitudinal opening 56 is formed in the forward end of body 12 and extends through cap portion 26 into base portion 24 perpendicularly through transverse opening 54. Nut 50 is placed within transverse opening 54 so that its opening is positioned coaxially with longitudinal opening 56. Adjustment screw 48 is advanced through longitudinal opening 56 and is threadably received by nut 50. Once the adjustment screw has passed through nut 50, a forward pin 58 on adjustment screw 48 is inserted through a central opening formed within key 52. Pin 58 is then slightly mushroomed after it has passed through key 52 to prevent its removal therefrom.

Key 52 is provided with a radially extending tab 60. When the mounting assembly is disposed within base potion 24, tab 60 should be placed in a generally upward direction. In this position, tab 60 can be disposed through an opening 62, which is formed in the mounting end 47 of blade 44. In this coupled position, blade 44 will move longitudinally in correlation with the fore and aft movement of adjustment screw 48.

For the convenience and safety of the operator, a pair of blade storage compartments 64 and 64' are provided in the rearward end of body 12 and extend longitudinally therein. Compartments 64 and 64' are sized to accommodate one or more replacement blades 44', which are similar to blade 44. To retain the replacement blades 44' within compartments 64 and 64', plugs 66 and 66' are provided. Accordingly, replacement blades 44' are stored in a position that allows the user easy access without the risk of losing the replacement blades 44' or being accidentally cut by the same.

Figure 5:
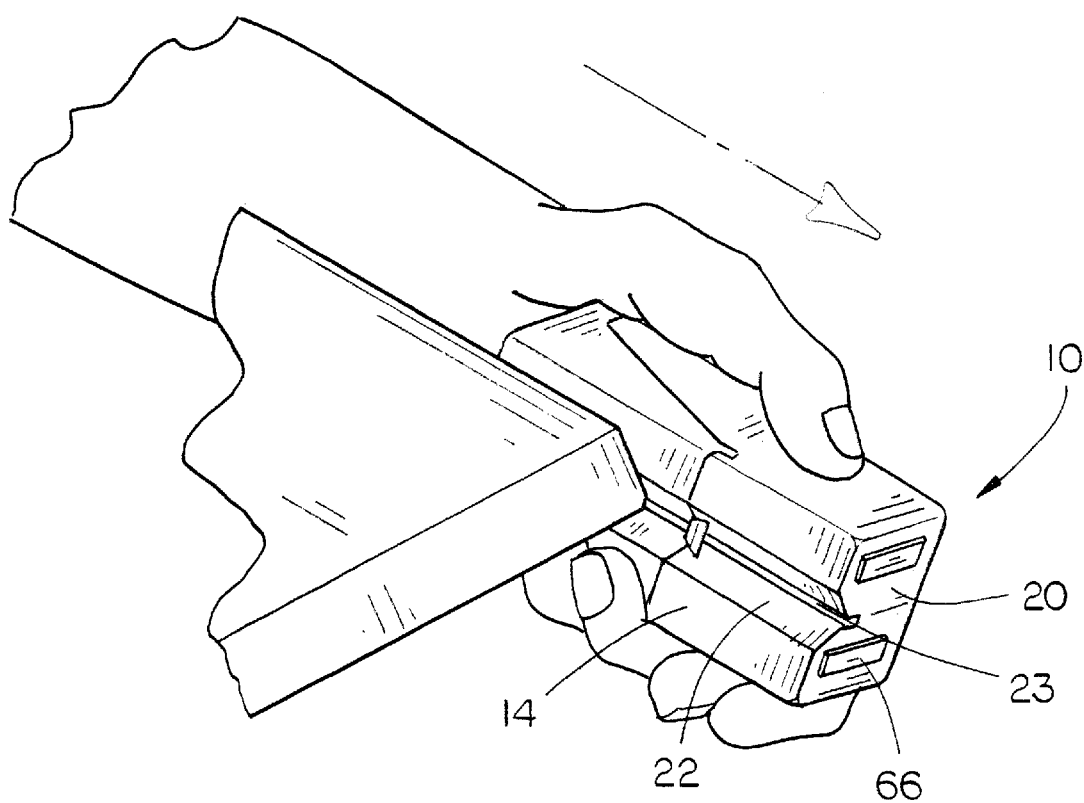
FIG. 5 is a perspective view of the deburring tool of the present invention while in use.
Figure 6:
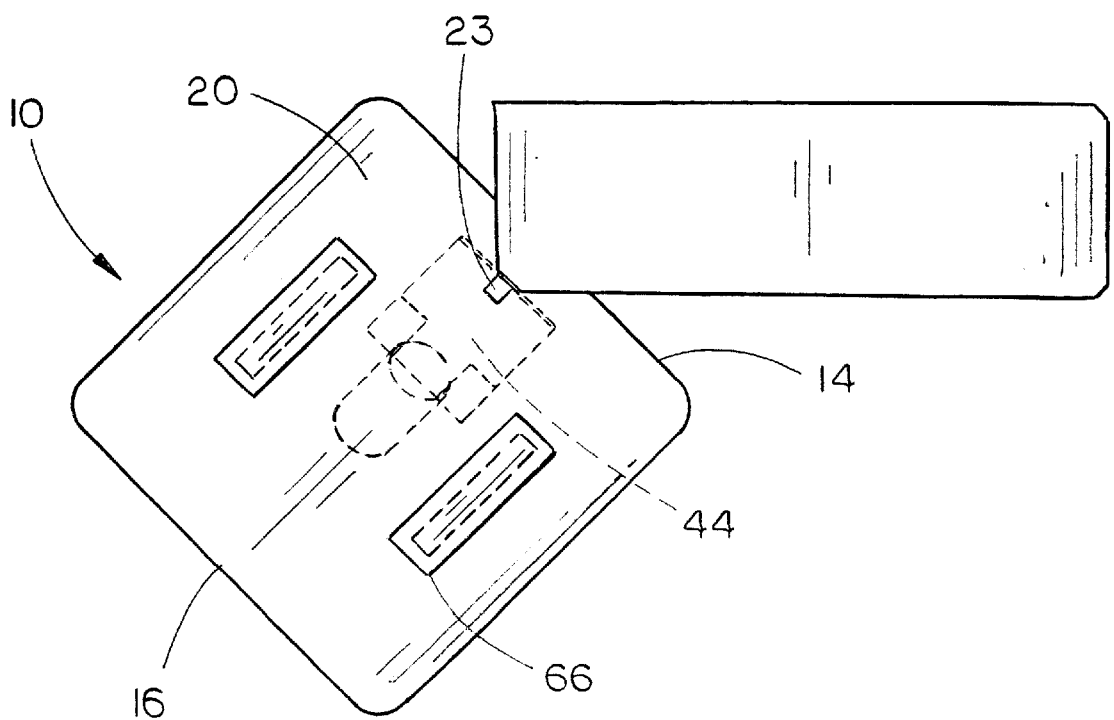
FIG. 6 is a front view of the deburring tool of the present invention engaged with the edge of an object.

FIGS. 5 and 6 illustrate the simple use of the deburring tool 10 to remove the edge of a selected object. The user grips the deburring tool 10 so that the lower surface 16 is adjacent to the user's palm and the forward end 20 extends outwardly from the user's hand. The user then places longitudinal groove 22 closely adjacent to the edge of the object that is to be trimmed. As the user advances the deburring tool 10 in a forward direction, blade 44 engages the edge of the object and trims the same at the predetermined depth. The edge pieces that are removed from the blade are guided through opening 42 and collected therein until the user turns the deburring tool 10 so that its lower surface 16 is facing downwardly. The user may then simply move his hand away from opening 42 to discharge the edge pieces that have collected therein. It is contemplated that a plug (not shown) could be formed of a size sufficient to selectively and removably cover opening 42 until such time as the user was ready to discharge the edge pieces therein.

In the drawings and in the specification, there have been set forth preferred embodiments of the invention and although specific items are employed, these are used in a generic and descriptive sense only and not for purposes of limitation. Changes in the form and proportion of parts, as well as a substitution of equivalents, are contemplated as circumstances may suggest or render expedient without departing from the spirit or scope of the invention as further defined in the following claims.

Thus it can be seen that the invention accomplishes at least all of its stated objectives.

I claim:

1. A tool for trimming an edge of an object, comprising:
   an elongated body having upper and lower surfaces and forward and rearward ends;
   a longitudinal channel formed in the upper surface of said body; said longitudinal channel being adapted to receive the edge of the object;
   an opening formed in the lower surface of said body intermediate the forward and rearward ends thereof; said opening extending in a generally upward direction so that said opening is placed in open communication with said longitudinal channel;
   a blade, having opposing cutting and mounting ends, operatively secured within said body intermediate the forward and rearward ends thereof; said cutting end of said blade being adapted to be at least partially passed through said opening and into said longitudinal channel;
   adjustment means operatively coupled to said blade for selectively extending and retracting the blade along its longitudinal axis;
   said adjustment means comprising a generally elongated adjustment screw extending inwardly from the rearward end of said body; said adjustment screw being operatively coupled to the mounting end of said blade to selectively extend and retract the blade along its longitudinal axis;

said adjustment means further comprising a key having an elongated tab extending outwardly therefrom, said tab being operatively received by the mounting end of said blade.

2. The tool of claim 1 wherein said key is operatively secured to said adjustment screw.

3. The tool of claim 2 wherein said adjustment means is further comprised of a nut having an opening disposed therethrough; said nut being operatively secured within said body to threadably receive said adjustment screw.

4. A tool for trimming an edge of an object, comprising:

an elongated body having upper and lower surfaces and forward and rearward ends;

a longitudinal channel formed in the upper surface of said body; said longitudinal channel being adapted to receive the edge of the object;

an opening formed in the lower surface of said body intermediate the forward and rearward ends thereof; said opening extending in a generally upward direction so that said opening is placed in open communication with said longitudinal channel;

a blade, having opposing cutting and mounting ends, operatively secured within said body intermediate the forward and rearward ends thereof; said cutting end of said blade being adapted to be at least partially passed through said opening and into said longitudinal channel; and adjustment means operatively coupled to said blade for selectively extending and retracting the blade along its longitudinal axis;

said adjustment means comprising an adjustment screw positioned generally coaxial with the longitudinal axis of said blade.

5. The tool of claim 4 wherein said adjustment screw extends inwardly from the rearward end of said body; said adjustment screw being operatively coupled to the mounting end of said blade to selectively extend and retract the blade along its longitudinal axis.

6. The tool of claim 4 further having at least one elongated storage compartment, having open and closed ends, formed in said body; said at least one elongated storage compartment being adapted to removably receive at least one replacement blade.

7. The tool of claim 6 wherein said at least one storage compartment is longitudinally disposed adjacent the forward end of said body.

8. The tool of claim 6 further comprising at least one plug; said at least one plug being adapted to be removably received by the open end of said at least one storage compartment to close the same and secure said at least one replacement blade therein.

9. The tool of claim 4 wherein said longitudinal channel is generally V-shaped.

10. The tool of claim 4 further having a longitudinal channel extender formed in said body parallel to and in open communication with said longitudinal channel; said channel extender being adapted to accommodate the passage of excess material on the edge of said object.

11. A tool for trimming an edge of an object, comprising:

an elongated body having upper and lower surfaces and forward and rearward ends; said body comprising an elongated base having upper and lower surfaces, forward and rearward ends, and a generally inclined surface extending from said upper surface to said rearward;

a longitudinal channel formed in the upper surface of said body; said longitudinal channel being adapted to receive the edge of the object;

an opening formed in the lower surface of said body intermediate the forward and rearward ends thereof; said opening extending in a generally upward direction so that said opening is placed in open communication with said longitudinal channel;

a blade, having opposing cutting and mounting ends, operatively secured within said body intermediate the forward and rearward ends thereof; said cutting end of said blade being adapted to be at least partially passed through said opening and into said longitudinal channel; and adjustment means operatively coupled to said blade for selectively extending and retracting the blade along its longitudinal axis.

12. The tool of claim 11 wherein said body is further comprised of a generally angular cap having first and second ends; said cap being adapted to be operatively secured to said base adjacent the inclined surface and rearward end thereof.

13. The tool of claim 12 further having at least one tab extending outwardly from said cap adjacent the first end thereof.

14. The tool of claim 13 further having at lease one transverse slot formed in said base adjacent the upper surface thereof; said transverse slot being adapted to releasably receive the at least one tab of said cap to operatively secure said cap to said base.

15. The tool of claim 12 further having an elongated key extending outwardly from said cap, intermediate the first and second ends thereof.

16. The tool of claim 15 further having at lease one longitudinal slot formed in the generally inclined surface of said base; said longitudinal slot being adapted to releasably receive the key extending from said cap to operatively secure said cap to said base.

17. The tool of claim 15 further comprising at least one mounting screw; said second end of said cap and said rearward end of said base being adapted to receive said at least one mounting screw to operatively secure said cap to said base.

18. The tool of claim 11 further comprising an elongated blade slot formed in the inclined surface of said base for operatively slidably receiving said blade.

* * * * *